(12) United States Patent
Shiomi

(10) Patent No.: US 7,755,669 B2
(45) Date of Patent: Jul. 13, 2010

(54) IMAGE CAPTURE APPARATUS AND IMAGE CAPTURE METHOD IN WHICH AN IMAGE IS PROCESSED BY A PLURALITY OF IMAGE PROCESSING DEVICES

(75) Inventor: Yasuhiko Shiomi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 797 days.

(21) Appl. No.: 10/997,187

(22) Filed: Nov. 24, 2004

(65) Prior Publication Data

US 2005/0117029 A1    Jun. 2, 2005

(30) Foreign Application Priority Data

Nov. 28, 2003  (JP) .............................. 2003-399319
Nov. 28, 2003  (JP) .............................. 2003-399322

(51) Int. Cl.
H04N 5/228     (2006.01)

(52) U.S. Cl. ................................................. 348/222.1
(58) Field of Classification Search ............... 348/222.1
See application file for complete search history.

(56) References Cited

U.S. PATENT DOCUMENTS

| 6,018,363 | A | * | 1/2000 | Horii ........................ 348/219.1 |
| 6,542,192 | B2 | * | 4/2003 | Akiyama et al. ........ 348/333.11 |
| 6,791,615 | B1 | | 9/2004 | Shiomi et al. |
| 7,176,966 | B2 | * | 2/2007 | Inoue et al. ............... 348/222.1 |
| 2002/0008764 | A1 | * | 1/2002 | Nakayama ................... 348/239 |
| 2002/0113885 | A1 | * | 8/2002 | Inoue et al. .................. 348/280 |
| 2003/0090585 | A1 | * | 5/2003 | Anderson ................. 348/333.11 |
| 2003/0160874 | A1 | * | 8/2003 | Kuroiwa ................... 348/220.1 |
| 2004/0126019 | A1 | * | 7/2004 | Ikebe et al. .................. 382/232 |
| 2005/0053131 | A1 | * | 3/2005 | Domke et al. .......... 375/240.01 |
| 2005/0151857 | A1 | * | 7/2005 | Noguchi et al. .......... 348/231.7 |

FOREIGN PATENT DOCUMENTS

JP         2002-084493         3/2002

* cited by examiner

*Primary Examiner*—David L Ometz
*Assistant Examiner*—Dillon Durnford-Geszvain
(74) *Attorney, Agent, or Firm*—Canon USA Inc IP Div

(57) ABSTRACT

An image capture system is provided that increases processing speed after an image is captured and also increases the rate at which data is read from an image capture device during a shooting sequence. The image capture system includes an image capture device for capturing an object image and converting the captured object image into an electrical signal, a plurality of image processing devices, and a distribution device for distributing the electrical signal from the image capture device to the plurality of image processing devices. The plurality of image processing devices generate image signals by processing the electrical signal output from the distribution device and are provided in parallel with each other. Each of the plurality of image processing devices concurrently processes the electrical signal for one frame.

13 Claims, 11 Drawing Sheets

IMAGE CAPTURE APPARATUS AND IMAGE CAPTURE METHOD IN WHICH AN IMAGE IS PROCESSED BY A PLURALITY OF IMAGE PROCESSING DEVICES

CROSS-REFERENCE TO RELATED APPLICATIONS

This application claims priority from Japanese Patent Applications No. 2003-399322 filed Nov. 28, 2003 and No. 2003-399319 filed Nov. 28, 2003, which are hereby incorporated by reference herein.

BACKGROUND OF THE INVENTION

1. Field of the Invention

The present invention relates to image capture systems (e.g., digital camera) for capturing and processing object images.

2. Description of Related Art

Conventional image capture systems (e.g., digital still cameras) typically include various components, as shown in FIG. 11. In FIG. 11, an overall control CPU (central processing unit) 116 detects a change in state of a camera operation switch (not shown) having a main switch and a release switch. The camera operation switch, which is operated by a user, enables power supply to the respective circuit blocks.

An object image within the range of a photographic image plane is formed on an image sensor 100 (CCD (charge-coupled device) by a main photographic optical system 118. An output signal from the image sensor 100 is converted into a digital signal for each pixel by a CDS/AGC/AD (correlated double sampling/automatic gain control/analog-digital) circuit 103.

The image sensor 100 generates an image signal when driven in a predetermined manner by the output of a driver circuit 101. The driver circuit 101 is for horizontal and vertical driving of each pixel based on a signal from the timing generator (TG/SSG) 102, which determines drive timing for the entire image capture system.

The output signal from the CDS/AGC/AD circuit 103 is applied to a correction block 104. The correction block 103 performs correction for shading caused by a combination of the image sensor 100 and the main photographic optical system 118, and performs correction to remove pattern noise inherent in the image sensor 100.

The outputs of the correction block 104 are sequentially stored, as frame data, in a buffer memory 106 via a front memory controller 105, so that images captured with a continuous shooting operation of the camera are temporarily stored.

The front memory controller 105 operates on the basis of a signal from a timing control block 107, which operates in synchronism with the timing generator 102. Accordingly, the front memory controller 105 operates in synchronism with the image sensor 100.

When at least one frame image has been captured, captured image data stored in the buffer memory 106 is temporarily transferred to a work memory 111 via a rear memory controller 108 under the control of the front memory controller 105.

The rear memory controller 108 operates on the basis of a signal from a timing control block 109, which also operates in synchronism with the timing generator 102.

Then, image data stored in the work memory 111 is read out and applied to a color processing block 112, which is connected to a bus A connected to the work memory 111. The color processing block 112 performs the so-called picture adjustment, such as color interpolation and color matrix correction, to convert the image data into RGB data values and further into YCrCb data values. The color processing block 112 then stores the processed image data in the work memory 111.

The image data re-stored in the work memory 111 is then read out and applied to a JPEG processing block 113. The JPEG processing block 113 compresses image data according to a predetermined compression format and stores the compressed image data in a card memory 115 (usually, a non-volatile memory such as a flash memory) via a card controller 114.

The user can select a viewing mode of the image capture system in which images represented by captured image data can be viewed. In the viewing mode, compressed image data stored in the card memory 115 is read out and is decompressed by the JPEG processing block 113 into normal image data for every pixel. The resultant image data is then transferred to the work memory 111 so as to externally display an image represented by the image data on a monitor display device (not shown).

To control the camera, the overall control CPU 116 executes instructions in accordance with instruction codes stored in an instruction memory 117, which is connected to a bus B connected to the overall control CPU 116. For example, the overall control CPU 116 controls driving of the main photographic optical system 118 via a lens control portion 119 and stores various items of information attached to image data in the memory card 115 via a communication I/F (interface) 110.

Japanese Laid-Open Patent Application No. 2000-253305 discloses an example of the aforementioned system.

When continuous shooting occurs in digital cameras, frame images obtained are gradually stored as raw data in a buffer memory. Then, the stored frame image data are sequentially transferred to a rear processing block, where color processing and JPEG processing are performed. The readout rate of an image sensor can be significantly increased to capture 8 frames or more per second, which is desirable (equivalent to that of silver-halide cameras used by professional photographers).

There are a number of proposed methods for increasing the readout rate of an image sensor. In one method, the frequency of a driving clock signal produced by a timing generator is heightened to simply increase the driving speed of a driver. In another method, image data are simultaneously read out from two or more output terminals of an image sensor, and subsequent processing operations up to storing in a buffer memory are performed in parallel at a plurality of lines corresponding to the number of output terminals of the image sensor.

In the conventional digital camera described above, image data stored in the buffer memory 106 is transferred to the work memory 111 via the memory controllers 105 and 108. The image data stored in the work memory 111 is sequentially transferred to the color processing block 112 and is then converted into RGB image data or YCrCb image data in a predetermined format. The converted image data is sequentially temporarily stored again in the work memory 111. Then, the image data re-stored in the work memory 111 is transferred to the JPEG processing block 113. In such a flow, processing operations such as read out operations are performed via the bus A connected between the respective processing blocks so that bus A becomes inundated with traffic.

Furthermore, when image data compressed by the JPEG processing block 113 is stored in the card memory 115, the writing rate of the card memory 115 itself becomes a bottle neck. In this case, the speed of the work memory 111 for outputting image data processed by the JPEG processing block 113 will inevitably decrease. As a result, a large amount of data accumulates in the work memory 111.

Consequently, even if the frame-advancement speed of the camera is increased, the low speed of the rear processing operation inhibits continuous shooting operation at high speed. Thus, unless the capacity of the buffer memory 106 or the work memory 111 is considerably increased, the camera cannot release the shutter immediately after the continuous shooting operation.

SUMMARY OF THE INVENTION

The present invention provides an image capture system that increases processing speed after an image is captured while increasing the rate at which data is read from the image capture device during a shooting sequence.

In one aspect of the present invention, an image capture system comprises an image capture device for capturing an object image and converting the captured object image into an electrical signal, a plurality of image processing devices, a distribution device for distributing the electrical signal from the image capture device to the plurality of image processing devices, the plurality of image processing devices generating image signals by processing the electrical signal output from the distribution device, wherein the plurality of image processing devices are provided in parallel with each other, and each of the plurality of image processing devices concurrently processes the electrical signal for one frame.

In another aspect of the present invention, an image capture method for an image capture system including an image capture device for capturing an object image and converting the captured object image into an electrical signal, a plurality of image processing devices provided in parallel with each other, a distribution device for distributing the electrical signal from the image capture device to the plurality of image processing devices, the plurality of image processing devices generating image signals by processing the electrical signal output from the distribution device, comprises causing each of the plurality of processing devices to concurrently process the electrical signal for one frame.

An advantage of the present invention is that the image capture system increases processing speed after an image is captured while increasing the rate at which data is read from the image capture device during a shooting sequence. As such, the number of frames capturable in any single continuous shooting operation is desirably increased.

Other further features and advantages of the present invention will become apparent to those skilled in the art upon reading of the following detailed description of embodiments thereof when taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE EMBODIMENTS

Embodiments of the present invention will be described in detail below with reference to the accompanying drawings. However, the dimensions, materials, shapes and relative positions of the constituent parts shown in the embodiments should be changed as convenient depending on various conditions and on the structure of the system adapted to the invention, and the invention is not limited to the embodiments described herein.

First Embodiment

An image capture system according to a first embodiment of the invention includes one front block and two or more rear blocks. The front block constitutes a temporary storage section for temporarily storing captured images. The rear block constitutes an image processing section including a color processing block, a JPEG processing block, a card-memory controller and a card memory. The two or more rear blocks have the same function and are arranged and connected in parallel with each other.

More specifically, in a continuous shooting operation, one rear block processes the first captured frame image. Meanwhile, a second captured frame image is captured, and if capturing is completed while the first captured frame image is being processed by the rear block, the second captured frame image is then processed by another rear block. Thus, the rear blocks for performing image processing, switch between odd-numbered captured frame images and even-numbered captured frame images.

Figure 1:
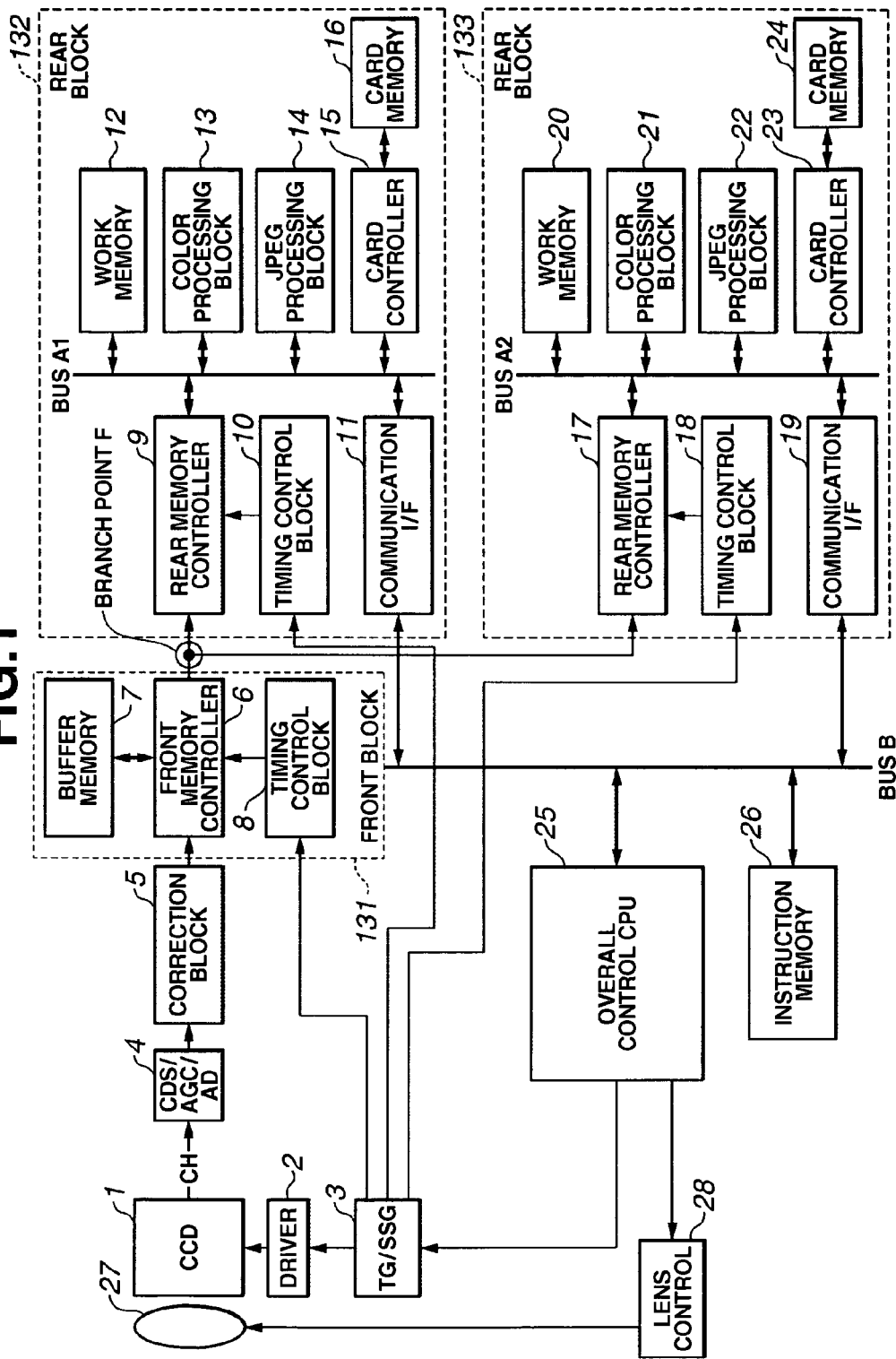
FIG. 1 is a block diagram showing the hardware construction of an image capture system according to each of first and second embodiments of the invention.

FIG. 1 is a block diagram showing the hardware construction of an image capture system according to a first embodiment of the invention. In the image capture system shown in FIG. 1, an overall control CPU (central processing unit) 25 detects a change in state of a camera operation switch (not shown; composed of a main switch and a release switch)

operated by a user and starts supply of electric power to each circuit block and initial setting thereof.

The image capture system includes an image sensor 1, a driver circuit 2, a timing generator (TG/SSG) 3, a CDS/AGC/AD (correlated double sampling/automatic gain control/analog-digital) circuit 4, a correction block 5, an overall control CPU (central processing unit) 25, an instruction memory 26, a main photographic optical system 27, a lens control portion 28, a front block 131 and two rear blocks 132 and 133. The image sensor 1 (e.g., CCD) serves as an image capture device for capturing an object image and converting the captured object image into an electrical signal for each pixel. The front block 131 serves as a temporary storage device for temporarily storing the electrical signal output from the image capture device. The rear blocks 132 and 133 serve as a plurality of image processing devices for reading out the electrical signal stored in the front block 131 and processing the read-out electrical signal to generate an image signal. The rear blocks 132 and 133 are connected in parallel with each other and are configured to individually process the electrical signal stored in the front block 131. The electrical signal stored in the front block 131 is applied to the parallel-connected rear blocks 132 and 133 through a branch point F.

Note that the image capture system, which includes the image sensor 1, the front block 131 and the rear blocks 132 and 133, can be modified so that the rear blocks apply different parameters for processing. So, the rear block 132 may perform image processing by using a fist parameter, while the rear block 133 performs image processing by using a second parameter, thereby simultaneously applying different image processing operations to one and the same captured image.

The front block 131 includes a front memory controller 6, a buffer memory 7 and a timing control block 8. The front memory controller 6 and the buffer memory 7 are provided for temporarily storing an electrical signal output from the image sensor 1. The timing control block 8 is provided for synchronizing the front memory controller 6 with the image sensor 1. The correction block 5, the front memory controller 6 and the timing control block 8 are usually integrated into one chip. However, for the sake of convenience, the front block 131 is herein regarded as composed of the front memory controller 6, the buffer memory 7 and the timing control block 8, in view of its function.

The rear block 132 includes a rear memory controller 9, a timing control block 10, a communication I/F 11, a work memory 12, a color processing block 13, a JPEG processing block 14, a card controller 15 and a card memory 16. The timing control block 10 outputs a signal for operating the rear memory controller 9. The card memory 16 stores image data stored in the work memory 12 via the card controller 15. The rear memory controller 9, the JPEG processing block 14, the color processing block 13, the work memory 12, the card controller 15 and the communication I/F 11 are connected to a bus A1.

Similarly to the rear block 132, the rear block 133 also includes a rear memory controller 17, a timing control block 18, a communication I/F 19, a work memory 20, a color processing block 21, a JPEG processing block 22, a card controller 23 and a card memory 24. The timing control block 18 outputs a signal for operating the rear memory controller 17. The card memory 24 stores image data stored in the work memory 20 via the card controller 23. The rear memory controller 17, the JPEG processing block 22, the color processing block 21, the work memory 20, the card controller 23 and the communication I/F 19 are connected to a bus A2.

An object image within the range of a photographic image plane is formed on the image sensor 1 (CCD (charge-coupled device) in this case) by the main photographic optical system 27. An output signal from the image sensor 1 is converted into a digital signal in a predetermined format by the CDS/AGC/AD circuit 4 sequentially performing correlated double sampling, gain setting and AD conversion for each pixel.

The image sensor 1 generates an image signal when driven in a predetermined manner by the output of the driver circuit 2. The driver circuit 2 is for horizontal and vertical driving of each pixel based on a signal from the timing generator (TG/SSG) 3, which determines drive timing for the entire image capture system.

The output signal from the CDS/AGC/AD circuit 4 is applied to the correction block 5. The correction block 5 performs correction for shading caused by a combination of the image sensor 1 and the main photographic optical system 27, and performs correction to remove pattern noise inherent in the image sensor 1. The correction block 5 contains a multiplier circuit, an adder circuit and a data storage memory for use in correcting each pixel data with respect to the horizontal direction and vertical direction of two-dimensional image data.

After completion of the above processing, the outputs of the correction block 5 are sequentially stored, as frame data, in the buffer memory 7 via the front memory controller 6. (The buffer memory 7 may be an SDRAM or the like.) Thus, images captured with a continuous shooting operation are temporarily stored.

The front memory controller 6 is synchronized with the image sensor 1 using a signal from the timing control block 8, which operates in synchronism with the timing generator 3. The front memory controller 6 converts a sensor signal from the image sensor 1, which sequentially passes thorough the CDS/AGC/AD circuit 4 and the correction block 5, into predetermined pulse-width data and transfers the converted data to the buffer memory 7 by use of burst writing.

The buffer memory 7, the front memory controller 6 and the timing control block 8, as described above, may be integrated into one chip as the front block 131.

At a point of time when writing of image data of predetermined size is completed, the front memory controller 6 temporarily transfers captured image data stored in the buffer memory 7 to the work memory 12 via the rear memory controller 9.

The rear memory controller 9 operates on the basis of a signal from the timing control block 10, which also operates in synchronism with the timing generator 3.

Then, the rear memory controller 9 sequentially transfers image data stored in the work memory 12 to the color processing block 13, which is also connected to the bus A1, so as to perform the so-called picture adjustment.

The processing operation of the color processing block 13 is described below with reference to a block diagram of FIG. 4, which illustrates the internal construction of the color processing block 13. Image data supplied from the work memory 12 via the bus A is applied to a data input/output I/F 50. The data input/output I/F 50 converts the image data into data of a predetermined data width and supplies the converted image data to a color interpolation block 52. The color interpolation block 52 performs color interpolation processing to convert the image data into RGB data of three planes in cases where the image sensor 1 has a color filter array known as the Bayer array.

Image data processed by the color interpolation block 52 is then applied to a matrix correction block 53. The matrix correction block 53 performs matrix correction for outputting desired colors on the basis of spectral characteristics of a color filter inherent in the image sensor 1 and performs RGB-to-RGB conversion of image data.

Image data processed by the matrix correction block 53 is then applied to a gamma conversion block 54. The gamma conversion block 54 performs the so-called gamma conversion to cause image data to fall within a predetermined dynamic range by converting 12-bit digital data subjected to CDS/AGC/AD processing into 8-bit digital data. Image data processed by the gamma conversion block 54 is then applied to an RGB-YCrCb conversion block 55. The RGB-YCrCb conversion block 55 performs color conversion processing from RGB to YCrCb and outputs the processed image data to a false-color elimination block 56. The false-color elimination block 56 performs processing for eliminating false colors occurring in Cr and Cb components.

An example of false-color elimination processing is the use of a median filter to eliminate color moiré patterns, etc., caused by the relationship between sampling frequency and image frequency.

Image data processed by the false-color elimination block 56 is then applied to an edge enhancement block 57. The edge enhancement block 57 performs edge enhancement processing for increasing the gain near an intermediate frequency of image data so as to enhance the contour of an image, and outputs the processed image data to a resolution conversion block 58. The resolution conversion block 58 resizes the image data into data of predetermined size.

When resizing into data of predetermined size is performed, image data is subjected to filtering processing and then to sub-sampling processing. These processing operations are performed equally with respect to the horizontal direction and vertical direction.

The above-described processing operations are sequentially performed for one frame. Image data processed by the color processing block 13 is then outputted to the work memory 12 via the data input/output I/F 50 and is stored again in individual areas of the work memory 12.

In the color processing block 13, each element block has its properties freely changeable based on data from the overall control CPU 25 via a parameter setting block 51. Accordingly, a user can change conditions of the picture adjustment for every captured image.

The rear memory controller 9 then sequentially transfers color-processed image data re-stored in the work memory 12 to the JPEG processing block 14, which is also connected to the bus A1. The JPEG processing block 14 performs image compression processing.

Operation of the JPEG processing block 14 is described below with reference to FIGS. 5 and 6.

Figure 5:
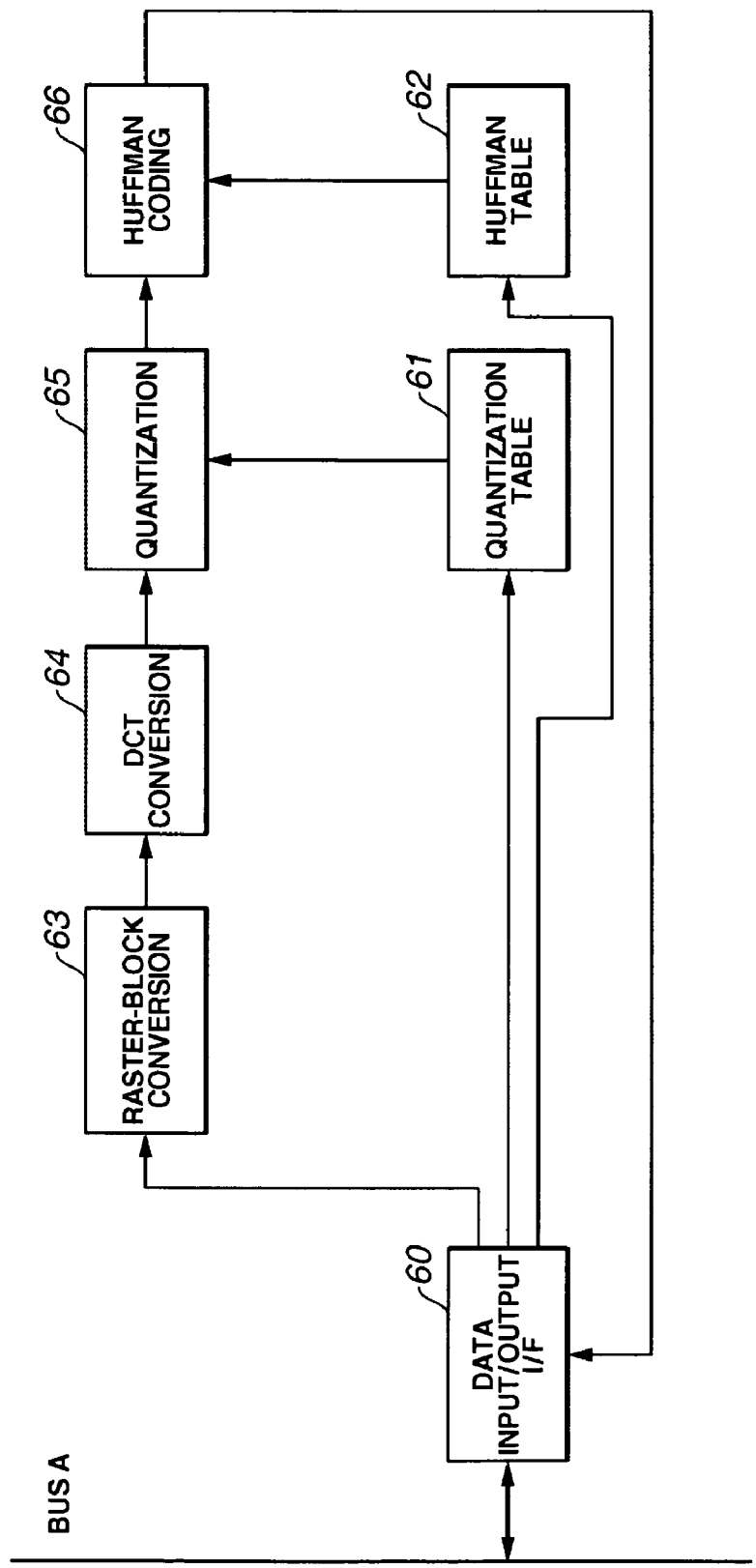
FIG. 5 is a block diagram showing the internal construction of a JPEG processing block included in the image capture system shown in FIG. 1 in cases where the JPEG processing block is of the lossy compression type.

FIG. 5 shows components of the JPEG processing block 14, which is the lossy compression type and is based on frequency conversion using DCT (discrete cosine transform) in accordance with an embodiment of the present invention.

In the JPEG processing block 14, the above-described color-processed image data stored in the work memory 12 is supplied to a raster-block conversion block 63 via a data input/output I/F 60. The raster-block conversion block 63 converts image data into two-dimensional blocks of data, each block being composed of 8 pixels in the horizontal direction by 8 pixels in the vertical direction.

Image data processed by the raster-block conversion block 63 is then applied to a DCT conversion block 64. The DCT conversion block 64 performs DCT conversion for converting blocks of 8×8 pixels into data of 8×8 pixels for every frequency component and calculates coefficients indicating low-frequency components up to high-frequency components in two-dimensional space.

Image data processed by the DCT conversion block 64 is then applied to a quantization block 65. The quantization block 65 performs quantization on coefficient values calculated by the DCT conversion block 64. This quantization is achieved by division for every coefficient on the basis of values previously set in a quantization table 61.

Then, the quantized data is read out from the quantization block 65 along a predetermined scanning direction and is applied to a Huffman coding block 66. The Huffman coding block 66 performs entropy coding based on values previously set in a Huffman table 62.

Image data compressed by the above-described method is again written in a predetermined area of the work memory 12 via the data input/output I/F 60. Then, a series of compression operations ends.

As another example of JPEG compression, a compression method of the lossless type is described below with reference to FIG. 6.

Figure 6:
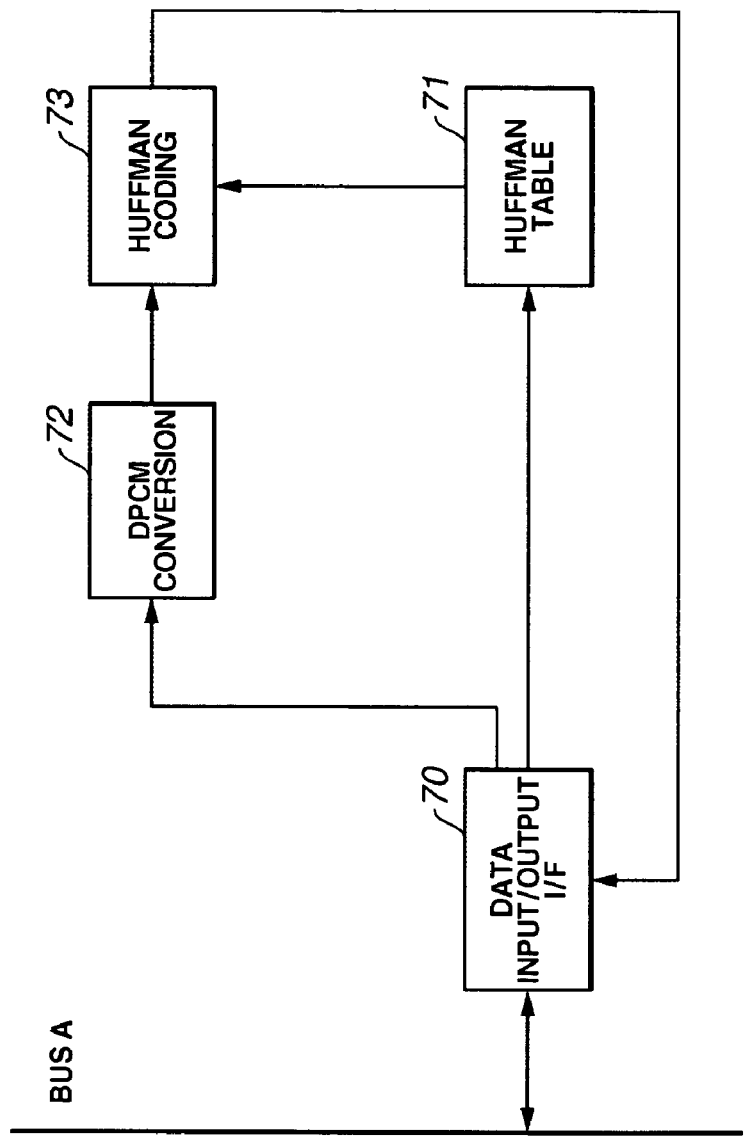
FIG. 6 is a block diagram showing the internal construction of a JPEG processing block included in the image capture system shown in FIG. 1 in cases where the JPEG processing block is of the lossless compression type.

FIG. 6 shows components of the JPEG processing block 14, which is the lossless compression type and is based on DPCM (differential pulse code modulation). In the JPEG processing block 14, the above-described color-processed image data stored in the work memory 12 is supplied to a DPCM conversion block 72 via a data input/output I/F 70. The DPCM conversion block 72 converts image data into difference data relative to predicted values.

Then, the DPCM-converted image data is read out from the DPCM conversion block 72 and is applied to a Huffman coding block 73. The Huffman coding block 73 performs entropy coding based on values previously set in a Huffman table 71.

Image data compressed by the above-described method is again written in a predetermined area of the work memory 12 via the data input/output I/F 70. Then, a series of compression operations ends.

The image data compressed by the JPEG processing block 14 according to a predetermined compression format as described above is then stored in the card memory 16 (usually, a non-volatile memory such as a flash memory) via the card controller 15.

The user can select a viewing mode of the image capture system in which images represented by captured image data can be viewed. In the viewing mode, compressed image data stored in the card memory 16 is read out and is decompressed by the JPEG processing block 14 into normal image data for every pixel. The resultant image data is then transferred to the work memory 12 so as to externally display a reduced-size image represented by the image data on a monitor display device (not shown).

The rear block 133 is also provided so as to process image data output from the front memory controller 6 in the same manner as the rear block 132.

In the rear block 133, captured image data stored in the buffer memory 7 via the front memory controller 6 is transferred to the work memory 20 via the rear memory controller 17. The rear memory controller 17 reads out image data from the work memory 20 according to a timing signal from the timing control block 18 and transfers the read-out image data to the color processing block 21. The color processing block 21 performs the picture adjustment according to the above-described method and transfers the processed image data to the work memory 20.

Then, the rear memory controller 17 reads out the processed image data stored in the work memory 20 and transfers the read-out image data to the JPEG processing block 22. The JPEG processing block 22 performs JPEG compression processing according to the above-described method and writes the compressed image data in the work memory 20.

The compressed image data is then written to the card memory 24 via the card controller 23 so that recording of the captured image is complete.

With regard to control of the whole image capture system and sequence control of the rear memory controller 9, etc., the overall control CPU 25 executes instructions in accordance with instruction codes stored in the instruction memory 26, which is connected to the bus B connected to the overall control CPU 25. For example, the overall control CPU 25 controls driving of the main photographic optical system 27 via the lens control portion 28 (focus driving and aperture driving) and performs shutter exposure control via a shutter control portion (not shown). Further, the overall control CPU 25 attaches various items of information, such as header information and shooting condition information, to captured image data processed in the rear block 132 via the communication I/F 11 and stores these items of information in the memory card 16.

Similarly, the overall control CPU 25 also performs the same processing for the rear block 133 via the communication I/F 19 and stores various items of information in the memory card 24.

The manner of transferring data from the front block 131 to the rear blocks 132 and 133 is described below with reference to FIG. 2.

Figure 2:
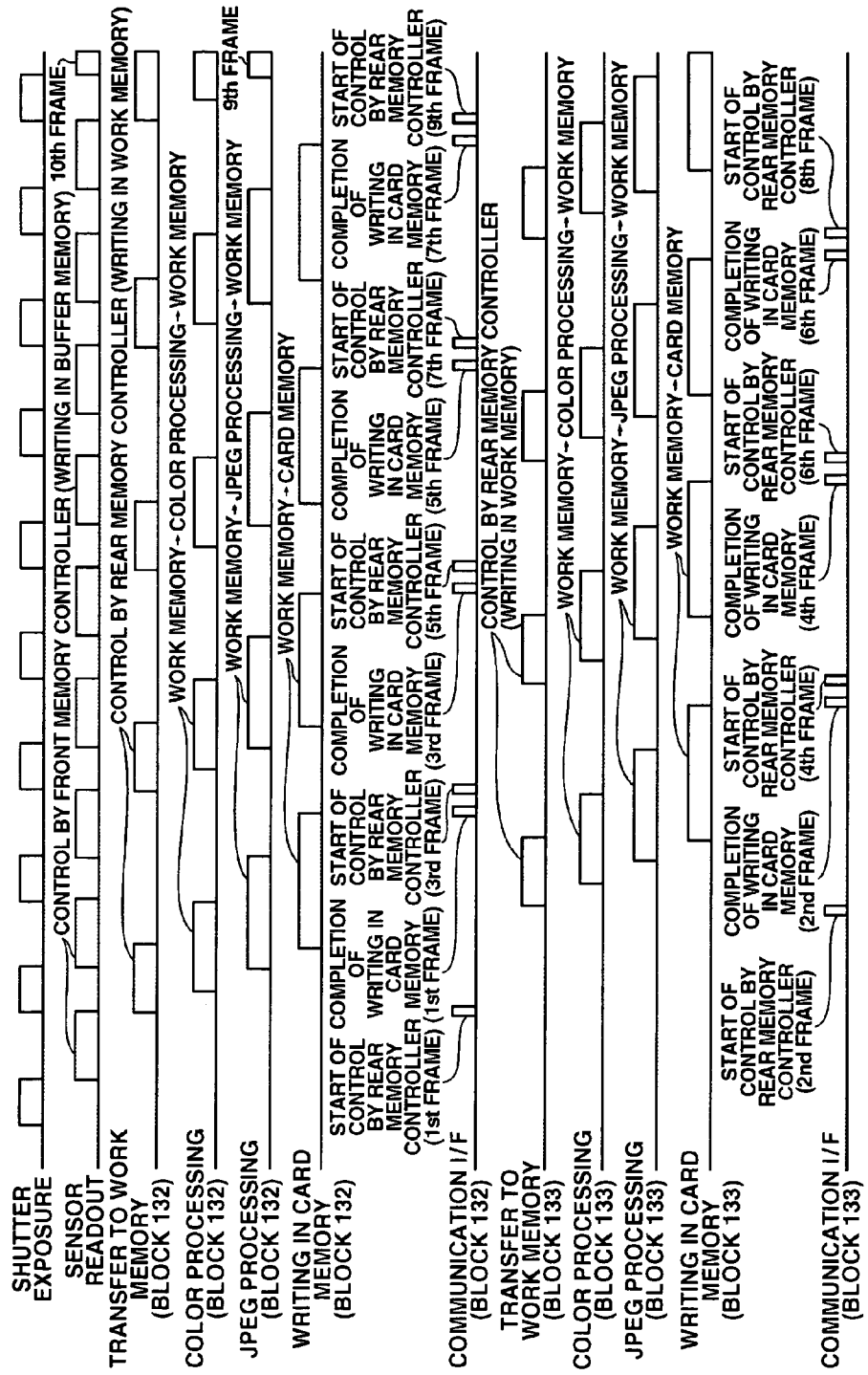
FIG. 2 is a timing chart illustrating the timing of operation of the image capture system according to the first embodiment.

FIG. 2 is a timing chart illustrating the timing of image capturing and processing sequence of the image capture system according to the first embodiment in the case where a continuous shooting operation is performed. In FIG. 2, the first line shows the timing of shutter exposure for ten frames. As shown, exposure is sequentially performed for frames one to ten at approximately the same intervals.

The second line in FIG. 2 shows the timing of a readout operation from the image sensor 1. The readout operation from the image sensor 1 starts when the shutter exposure for each frame is completed. As described above, captured image data is written in the buffer memory 7 under the control of the front memory controller 6.

The third line in FIG. 2 shows the timing of transfer of image data stored in the buffer memory 7 to the work memory 12 under the control of the rear memory controller 9. Transfer of image data starts at a point of time when writing of captured image data of the first frame in the buffer memory 7 is completed (or may start before completion of writing of all image data in the buffer memory 7).

The fourth line in FIG. 2 shows the timing of color processing in the rear block 132. The fifth line shows the timing of JPEG processing in the rear block 132. The sixth line shows the timing of writing in the card memory 16 of the rear block 132.

As described above, with respect to captured image data of the first frame, processing is gradually performed in such a manner that the start timing of one of the processing blocks 9, 13, 14 and 15 differs from that of the next processing block by a small length of time.

The seventh line in FIG. 2 shows the timing of operation of the communication I/F 11 of the rear block 132. As shown in FIG. 2, the communication I/F 11 first instructs the rear memory controller 9 to start a processing operation for captured image data of the first frame in response to a command from the overall control CPU 25.

After the first frame image data is completely written into the card memory 16, an interrupt signal is generated by the rear memory controller 9. The interrupt signal is used to inform the overall control CPU 25 that processing of the first frame image data is complete.

In the case of processing of captured image data of the second frame, as shown in the last line in FIG. 2, which shows the timing of operation of the communication I/F 19 in the rear block 133, the communication I/F 19 instructs the rear memory controller 17 to start a processing operation for the second frame image data in response to a command from the overall control CPU 25 before completion of processing of the first frame image data in the rear block 132.

In response to this instruction, the rear memory controller 17 of the rear block 133 transfers image data stored in the buffer memory 7 of the front block 131 to the work memory 20 at the timing shown by the fifth line from the bottom in FIG. 2.

The fourth line from the bottom in FIG. 2 shows the timing of color processing in the rear block 133. The third line from the bottom shows the timing of JPEG processing in the rear block 133. The second line from the bottom shows the timing of writing in the card memory 24 of the rear block 133.

As described above, with respect to captured image data of the second frame, processing is gradually performed in such a manner that the start timing of one of the processing blocks 17, 21, 22 and 23 differs from that of the next processing block by a small length of time.

The last line in FIG. 2 shows the timing of operation of the communication I/F 19 of the rear block 133. After the second frame image data is completely written into the card memory 24, an interrupt signal is generated by the rear memory controller 17. The interrupt signal is used to inform the overall control CPU 25 that processing of the second frame image data is complete.

As described above, image processing of capture image data of the second frame in the rear block 133 starts before completion of image processing of captured image data of the first frame in the rear block 132. Accordingly, the processed image data of the first and second frames are stored in the separate card memories 16 and 24.

Furthermore, processing of image data of the third frame starts in the rear block 132 before completion of processing of image data of the second frame in the rear block 133. Accordingly, very high-speed image processing can be attained by performing the so-called interleaved processing.

In the case of the timing shown in FIG. 2, processing of image data of the odd-numbered frames is performed by the rear block 132 and processing of image data of the even-numbered frames is performed by the rear block 133. However, such allocation of processing of captured image frames is not necessarily limitative. Any one of the rear blocks 132 and 133 that has completed its processing operation before the next processing begins can be used for that processing.

For example, in cases where processing of image data of the second frame is completed at the rear block 133 before processing of image data of the first frame is completed at the rear block 132, processing of image data of the third frame can be performed by the rear block 133 in succession. (Although there is a time difference between the first frame processing and the second frame processing in the case of the timing chart of FIG. 2, the start timing of processing by the rear block 132 may come closer to that by the rear block 133 as the processing operation proceeds, and the rear block 133 may complete its processing operation prior to completion of processing by the rear block 132.)

This allocation can be attained as follows. The overall control CPU 25 detects an interrupt signal transmitted from the rear memory controller 9 or 17 via the communication I/F 11 or 19 of the rear block 132 or 133 and, on the basis of such detection, determines which of the rear blocks 132 and 133 should perform processing of image data of the next frame.

As discussed above, according to the first embodiment, an image capture system is provided that increases processing speed after an image is captured while increasing the rate at which data is read from an image capture device during a shooting sequence. More specifically, in a continuous shooting operation, image data is read out from an image sensor at high speed. The read-out image data is temporarily stored in a continuous fashion in a buffer memory without changing its format (in the RAW data format). Frames of the captured image data are then simultaneously processed by multiple rear blocks. Specifically, processing of a first frame of captured image data is performed by a first rear block while processing of a second frame of captured image data is being performed by a second rear block. In this manner, the present invention avoids the disadvantages of the related art in which the number of frames capturable in a single continuous shooting operation is limited by low-speed image processing.

Furthermore, the above-described multiple processing includes not only a fixed multiple processing system but also a highly functional multiple processing system. In the fixed multiple processing system, processing of image data of the odd-numbered fames is performed by one rear block and processing of image data of the even-numbered frames is performed by the other rearblock. In the highly functional multiple processing system, any rear block which has already completed its processing operation and is ready to start the next processing operation is preferentially used, thereby enabling a higher-speed image capture system to be realized.

Second Embodiment

An image capture system according to a second embodiment of the invention has the same hardware arrangement as the first embodiment and is additionally settable to a shooting mode in which a plurality of different image processing operations are performed on captured image data of one and the same frame. In this shooting mode, for example, one rear block performs lossy compression processing (irreversible compression processing) on image data of the first frame, and the other rear block performs lossless compression processing (reversible compression processing) on image data of the same frame.

Operation of the image capture system according to the second embodiment is described below with reference to the timing chart of FIG. 3. The overall construction of the image capture system according to the second embodiment is the same as that of the first embodiment shown in FIG. 1. However, the JPEG processing block 14 in the rear block 132 shown in FIG. 1 is configured to perform, for example, the above-described lossy-type compression processing based on DCT conversion shown in FIG. 5, and the JPEG processing block 22 in the rear block 133 is configured to perform, for example, the above-described lossless-type compression processing based on DPCM conversion shown in FIG. 6.

The JPEG processing block 14 in the rear block 132 may be configured to perform lossless-type compression processing, and the JPEG processing block 22 in the rear block 133 may be configured to perform lossy-type compression processing.

Figure 3:
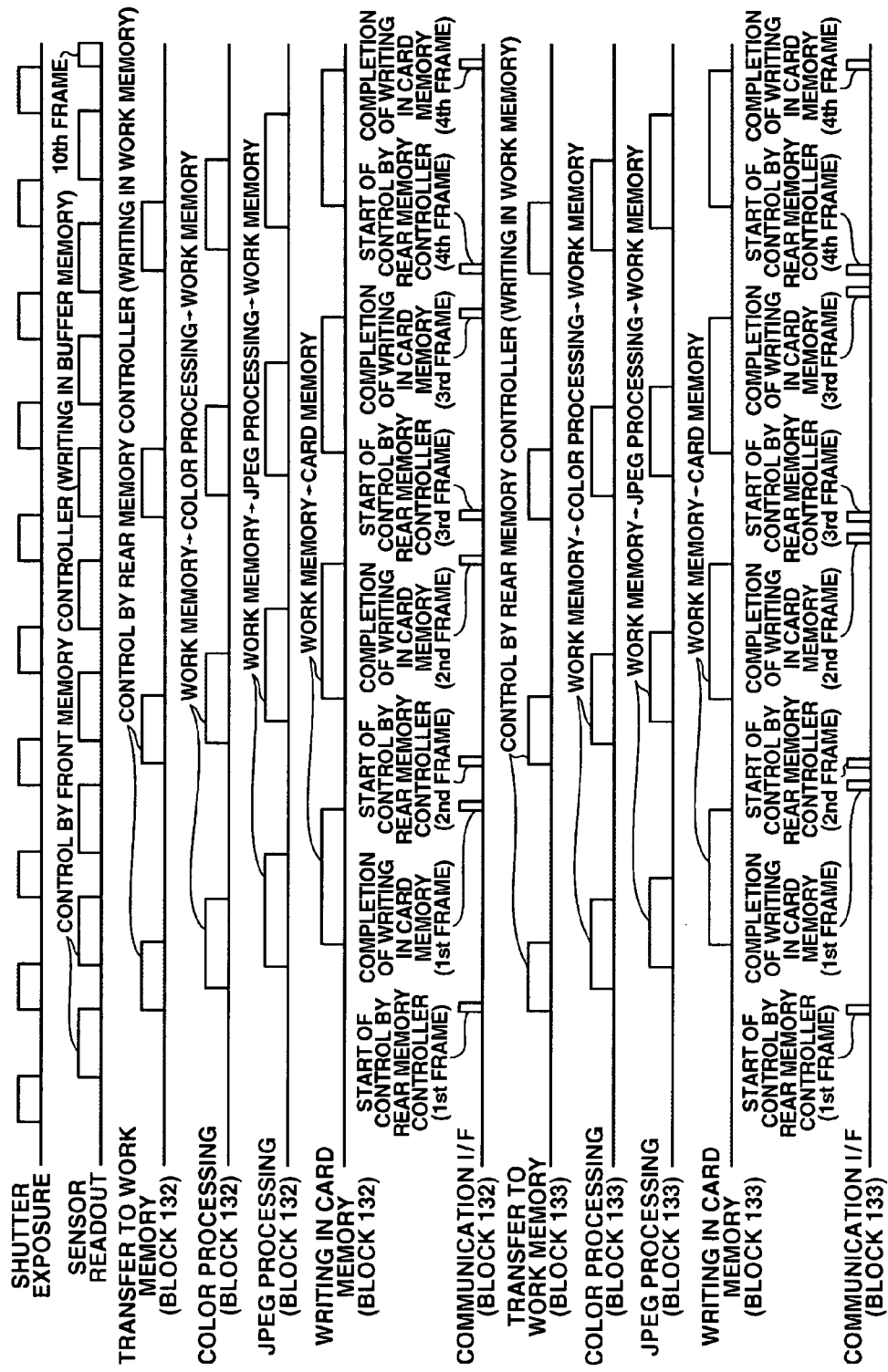
FIG. 3 is a timing chart illustrating the timing of operation of the image capture system according to the second embodiment.

FIG. 3 is a timing chart illustrating the timing of operation of the image capture system according to the second embodiment in the case where a continuous shooting operation is performed. In FIG. 3, the first line shows the timing of the shutter exposure for ten frames. As shown, exposure is sequentially performed for frames one to ten at approximately the same intervals.

The second line in FIG. 3 shows the timing of a readout operation from the image sensor 1. The readout operation from the image sensor 1 starts when the shutter exposure for each frame is completed. As described above, captured image data is written in the buffer memory 7 under the control of the front memory controller 6.

The third line in FIG. 3 shows the timing of transfer of image data stored in the buffer memory 7 to the work memory 12 under the control of the rear memory controller 9. Transfer of image data starts when writing of captured image data of the first frame in the buffer memory 7 is completed (or may start before completion of writing of all image data in the buffer memory 7).

The fourth line in FIG. 3 shows the timing of color processing in the rear block 132. The fifth line shows the timing of JPEG processing in the rear block 132. The sixth line shows the timing of writing in the card memory 16 of the rear block 132. In this case, JPEG processing is lossy-type compression processing based on DCT conversion shown in FIG. 5.

As described above, with respect to captured image data of the first frame, processing is gradually performed in such a manner that the start timing of one of the processing blocks 9, 13, 14 and 15 differs from that of the next processing block by a small length of time.

The seventh line in FIG. 3 shows the timing of operation of the communication I/F 11 of the rear block 132. As shown in FIG. 3, the communication I/F 11 first instructs the rear memory controller 9 to start a processing operation for captured image data of the first frame in response to a command from the overall control CPU 25.

After the first frame image data is completely written into the card memory 16, an interrupt signal is generated by the rear memory controller 9. The interrupt signal is used to inform the overall control CPU 25 that processing of the first frame image data for lossy-type JPEG compression is complete.

At the same timing as that of the rear block 132, the rear block 133 also starts processing on captured image data of the first frame. In the case of this processing of captured image data, as shown in the last line in FIG. 3, which shows the timing of operation of the communication I/F 19 in the rear block 133, the communication I/F 19 instructs the rear memory controller 17 to start a processing operation for the first frame image data in response to a command from the overall control CPU 25 at the same time as the start of processing of the first frame image data in the rear block 132.

In response to this instruction, the rear memory controller 17 of the rear block 133 transfers image data stored in the buffer memory 7 of the front block 131 to the work memory 20 at the timing shown by the fifth line from the bottom in FIG. 3.

The fourth line from the bottom in FIG. 3 shows the timing of color processing in the rear block 133. The third line from the bottom shows the timing of JPEG processing in the rear block 133. The second line from the bottom shows the timing of writing in the card memory 24 of the rear block 133. In this case, JPEG processing is lossless-type compression processing based on DPCM conversion shown in FIG. 6.

As described above, with respect to captured image data of the first frame, processing is gradually performed in such a manner that the start timing of one of the processing blocks 17, 21, 22 and 23 differs from that of the next processing block by a small length of time.

The last line in FIG. 3 shows the timing of operation of the communication I/F 19 of the rear block 133. After the first frame image data is completely written into the card memory 24, an interrupt signal is generated by the rear memory controller 17. The interrupt signal is used to inform the overall control CPU 25 that processing (lossless-type JPEG) of the first frame image data is complete.

As described above, the rear block 132 performs one type of image processing (lossy-type compression processing) on captured image data of the first frame, and, at the same time, the rear block 133 performs another type of image processing (lossless-type compression processing) on captured image data of the first frame. Accordingly, two types of image data processed according to different compression methods are concurrently formed from one and the same captured image data. Then, lossy-type compressed image data and lossless-type compressed image data are stored in the separate card memories 16 and 24.

Image processing on the second and subsequent captured image frames is performed in a similar manner as described above. The overall control CPU 25 gives the rear memory controllers 9 and 17 via the communication I/Fs 11 and 19 instructions to start control of processing operations, so that the same processing operation as that for the first frame image data begins.

Furthermore, one and the same captured image frame may be processed according to a plurality of color processing methods using different sets of parameters in addition to or instead of the use of different compression types. In that case, one rear block processes image data based on a first set of parameters, and the other rear block processes image data based on a second set of parameters.

More specifically, the color processing block 13 in the rear block 132 and the color processing block 21 in the rear block 133 are set to have respective different processing methods to perform different color processing operations on one and the same captured image.

Figure 4:
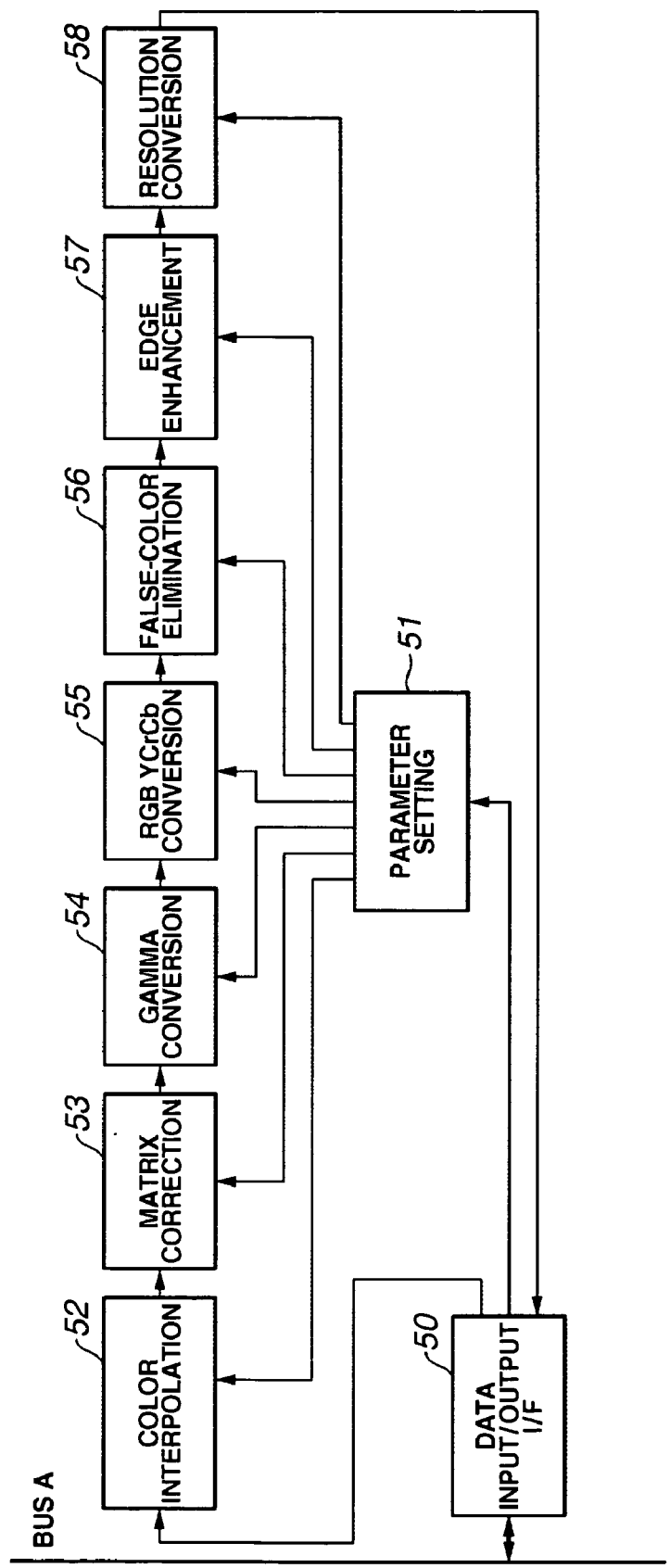
FIG. 4 is a block diagram showing the internal construction of a color processing block included in the image capture system shown in FIG. 1.

In this case, referring to the block diagram of the color processing block 13 or 21 shown in FIG. 4, setting values of the parameter setting block 51 in the rear block 132 or 133 are changed to change parameters of the color interpolation block 52 or the matrix correction block 53, so that images subjected to different color processing operations can be concurrently formed. Further, parameters of the resolution conversion block 58 are changed, so that files having different image sizes can be concurrently formed.

As discussed above, according to the second embodiment, an image capture system is provided that increases processing speed after an image is captured while increasing the rate at which data is read from an image capture device during a shooting sequence. More specifically, in the case of an image capture system capable of concurrently forming a plurality of different images by performing a plurality of image processing operations on one and the same captured image, image data is read out from an image sensor at high speed during a continuous shooting operation. The read-out image data is temporarily stored in a continuous fashion in a buffer memory without changing its format (in the RAW data format). During such storing operation, one processing blocks performs, on captured image data of the first frame, image processing using a first parameter, and the other processing block performs, on the same captured image data of the first frame, image processing using a second parameter, thereby approximately concurrently forming different images. Accordingly, a plurality of image data can be formed at high speed as compared to the related art wherein image processing is performed twice on the same captured image data.

In particular, in this case, a plurality of external memory cards can be provided. For example, lossy-type compressed image data can be recorded on one external memory card, and lossless-type compressed image data can be recorded on another external memory. Accordingly, such a classificatory function as to enable a user to easily classify recorded image data based on image compression types can be provided, and a high-speed shooting operation can be realized.

Note that the present invention is not limited to the arrangement where two rear blocks 132 and 133 are connected in parallel. For example, three or more rear blocks can be connected in parallel and can be switched in accordance with a shooting condition, etc.

Third Embodiment

An image capture system according to a third embodiment of the invention includes an image capture device and two or more image processing devices (image processing blocks) having the same function and connected in parallel to the image capture device. The image processing device includes a memory controller block for storing captured image data as it is, a color processing block for performing picture adjustment, a JPEG processing block, a card memory controller and a card memory.

More specifically, in a continuous shooting operation, captured image data are read out from the image capture device via two channel output terminals thereof. The read-out two-channel image data are then stored in separate buffer memories.

One of the two-channel image data is processed by the first image processing block, and the other of the two-channel image data is processed by the second image processing block. Thus, the same captured image data is processed by the two image processing blocks simultaneously.

In this case, image data at an area required for a particular image processing operation is processed by the two image processing blocks in an overlapping manner (i.e., data obtained at a partial area of an image sensor is processed by both the two processing blocks at the channels CH1 and CH2). With respect to JPEG processing, one processing block receives data from the other processing block and exclusively performs that processing. In that instance, the processing blocks switch between captured image data of odd-numbered frames and captured image data of even-numbered frames.

Figure 7:
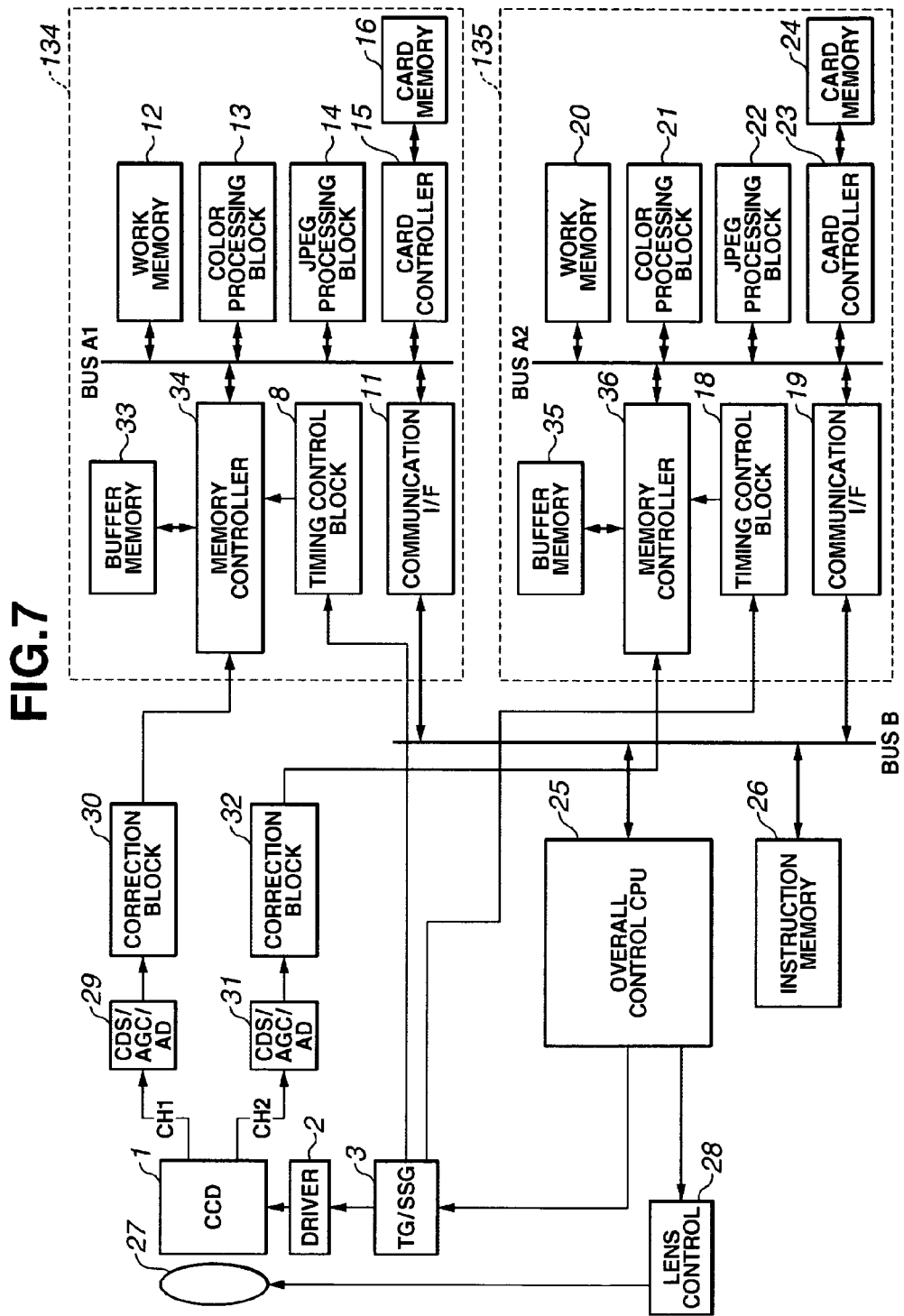
FIG. 7 is a block diagram showing the hardware construction of an image capture system according to a third embodiment of the invention.

FIG. 7 is a block diagram showing the hardware construction of an image capture system according to the third embodiment. In the image capture system shown in FIG. 7, an overall control CPU (central processing unit) 25 detects a change in state of a camera operation switch (not shown; composed of a main switch and a release switch) operated by a user and starts supply of electric power to each circuit block and initial setting thereof.

The image capture system includes an image sensor 1, a driver circuit 2, a timing generator (TG/SSG) 3, two CDS/AGC/AD (correlated double sampling/automatic gain control/analog-digital) circuits 29 and 31, two correction blocks 30 and 32, an overall control CPU (central processing unit) 25, an instruction memory 26, a main photographic optical system 27, a lens control portion 28, and two image processing blocks 134 and 135. The image sensor 1 serves as an image capture device for capturing an object image and converting the captured object image into an electrical signal for each pixel. The image processing blocks 134 and 135 serve as a plurality of image processing devices for processing the electrical signal output from the image sensor 1 so as to generate an image signal. The image processing blocks 134 and 135 are respectively connected to the output terminals CH1 and CH2 of the image sensor 1 via the CDS/AGC/AD circuits 29 and 31 and the correction blocks 30 and 32, as shown in FIG. 7. Thus, the image processing blocks 134 and 135 are connected in parallel with respect to the image sensor 1.

The image processing block 134 includes a memory controller 34, a buffer memory 33, a timing control block 8, a communication I/F 11, a work memory 12, a color processing block 13, a JPEG processing block 14, a card controller 15 and a card memory 16. The memory controller 34 and the buffer memory 33 constitute a temporary storage device for temporarily storing an electrical signal output from the image sensor 1. The timing control block 8 is provided for synchronizing the memory controller 34 with the image sensor 1. The JPEG processing block 14, the color processing block 13 and the work memory 12 constitute an image signal generating device for reading out and processing the electrical signal stored in the temporary storage device so as to generate the image signal. The card memory 16 stores image data stored in the work memory 12 via the card controller 15. The memory controller 34, the JPEG processing block 14, the color processing block 13, the work memory 12, the card controller 15 and the communication I/F 11 are connected to a bus A1.

The image processing block 135 includes a memory controller 36, a buffer memory 35, a timing control block 18, a communication I/F 19, a work memory 20, a color processing block 21, a JPEG processing block 22, a card controller 23 and a card memory 24. The memory controller 36 and the buffer memory 35 constitute a temporary storage device for temporarily storing an electrical signal output from the image sensor 1. The timing control block 18 is provided for synchronizing the memory controller 36 with the image sensor 1. The JPEG processing block 22, the color processing block 21 and the work memory 20 constitute an image signal generating device for reading out and processing the electrical signal stored in the temporary storage device so as to generate the image signal. The card memory 24 stores image data stored in the work memory 20 via the card controller 23. The memory controller 36, the JPEG processing block 22, the color processing block 21, the work memory 20, the card controller 23 and the communication I/F 19 are connected to a bus A2.

An object image within the range of a photographic image plane is formed on the image sensor 1 (CCD (charge-coupled device) in this case) through the main photographic optical system 27. An output CH1 which is an output signal from the image sensor 1 is converted into a digital signal in a predetermined format by the CDS/AGC/AD circuit 29 sequentially performing correlated double sampling, gain setting and AD conversion for each pixel. An output CH2 which is another output signal from the image sensor 1 is converted into a digital signal in the predetermined format by the CDS/AGC/AD circuit 31 sequentially performing correlated double sampling, gain setting and AD conversion for each pixel.

Figure 11:
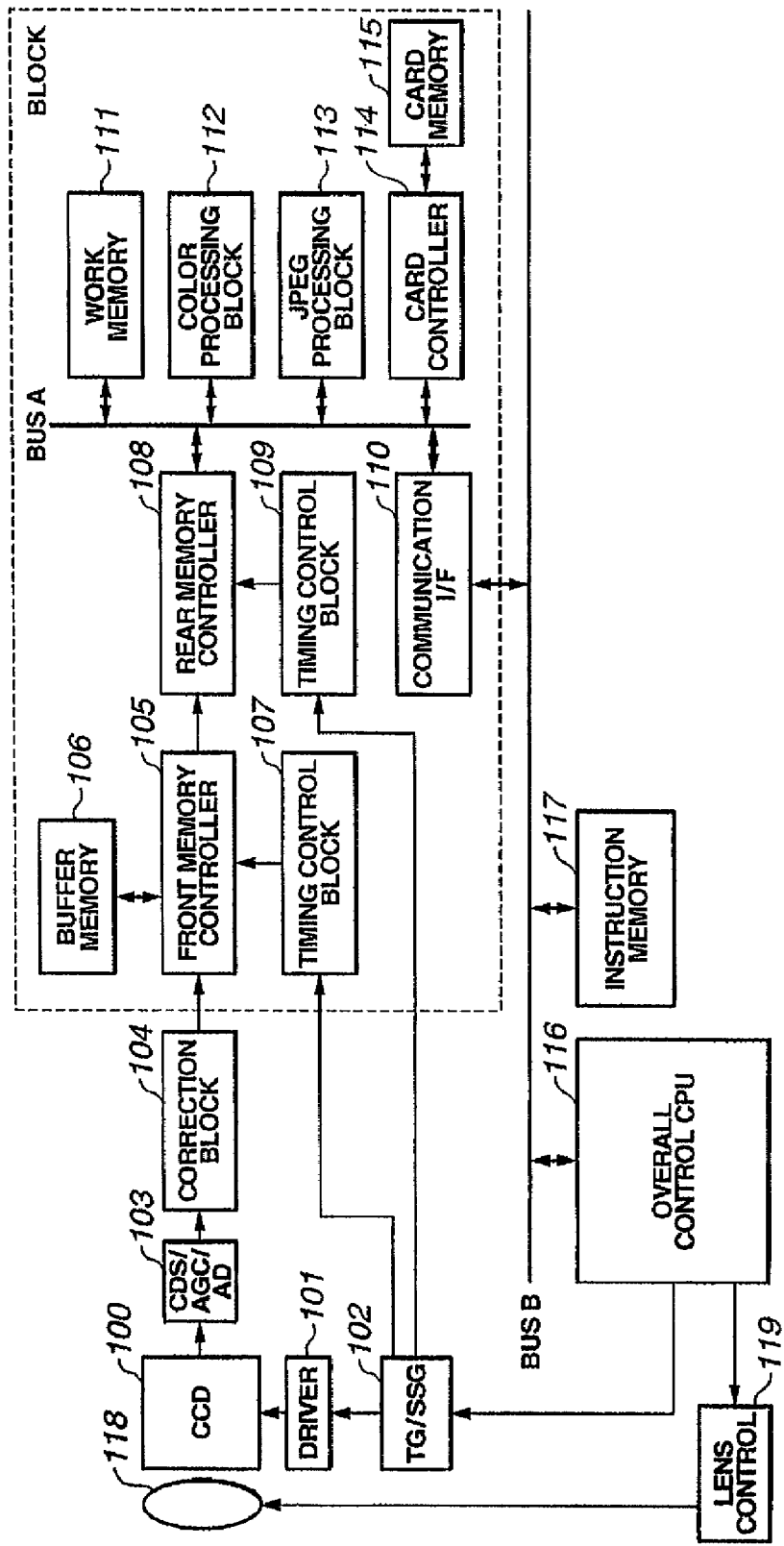
FIG. 11 is a block diagram showing the hardware construction of a conventional image capture system.

The image sensor 1 generates an image signal when driven in a predetermined manner by the output of the driver circuit 2. The driver circuit 2 is for horizontal and vertical driving of each pixel based on a signal from the timing generator (TG/SSG) 3, which determines drive timing for the entire image capture system. In the case of the third embodiment, the image sensor 1 has two output channels CH1 and CH2 as shown in FIG. 7 (the image sensor 1 may have three or more output channels) Image data are concurrently read out from the two output channels CH1 and CH2, so that image data can be read out at higher speed as compared with an image sensor having a single output channel such as that shown in FIG. 11.

The configuration of the image sensor 1 of the third embodiment is described below with reference to FIG. 9.

Figure 9:
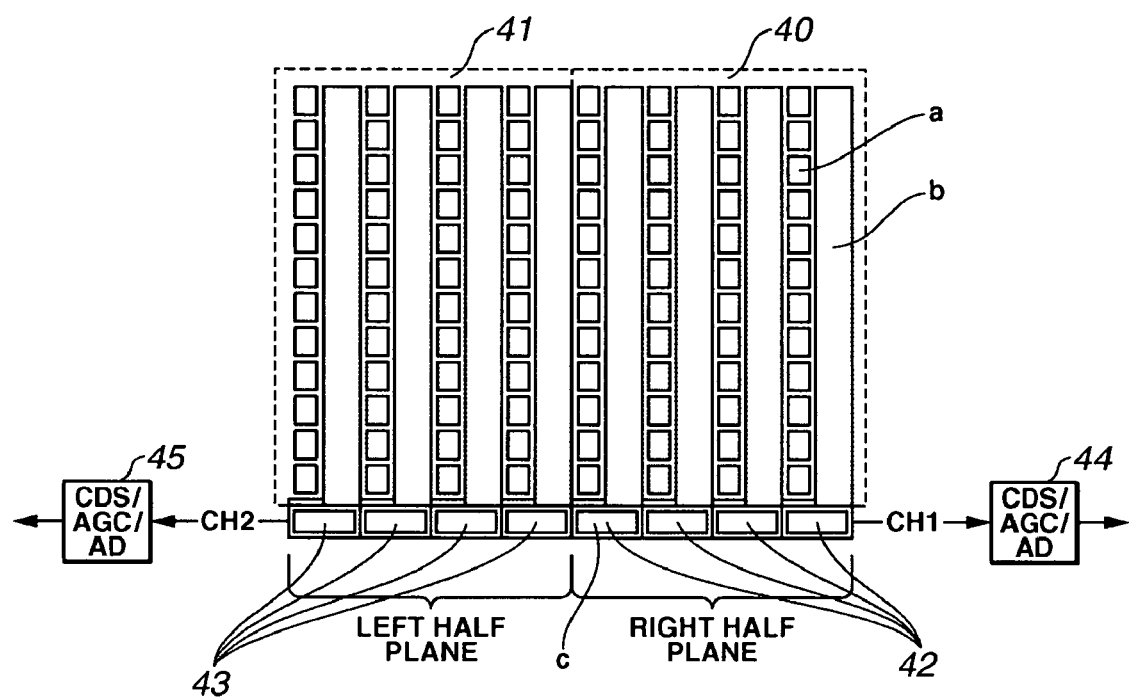
FIG. 9 is a schematic diagram showing the construction of an image sensor employed in the image capture system according to the third embodiment.

FIG. 9 is a schematic diagram showing the internal construction of an image sensor having two output channels CH1 and CH2. Reference character "a" denotes a photodiode portion for converting incident light into an amount of electric charge. Reference character "b" denotes a vertical CCD portion for transferring electric charge generated by the photodiode portion "a" in the so-called bucket brigade fashion from top to bottom in FIG. 9. Reference character "c" denotes a horizontal CCD portion for horizontally transferring electric charge transported by the vertical CCD portion "b" in the bucket brigade fashion to right and left output terminals. Thus, the image sensor shown in FIG. 9 is of a type in which pixel data are read out in a symmetrical manner from the center of an image plane.

Data at pixels indicated by a right-hand dotted-line part 40 of the image plane are read out from a horizontal CCD portion 42 via the right-hand output channel CH1 and are supplied to a CDS/AGC/AD circuit 44. On the other hand, data at pixels indicated by a left-hand dotted-line part 41 of the image plane are read out from a horizontal CCD portion 43 via the left-hand output channel CH2 and are supplied to a CDS/AGC/AD circuit 45.

Referring again to FIG. 7, the output signal from the CDS/AGC/AD circuit 29 is applied to the correction block 30. The correction block 30 performs correction for shading caused by a combination of the image sensor 1 and the main photographic optical system 27, and performs correction to remove pattern noise inherent in the image sensor 1. The correction block 30 contains a multiplier circuit, an adder circuit and a data storage memory for use in correcting each pixel data with respect to the horizontal direction and vertical direction of two-dimensional image data.

Similarly, the output signal from the CDS/AGC/AD circuit 31 is applied to the correction block 32. The correction block 32 also performs correction for shading caused by a combination of the image sensor 1 and the main photographic optical system 27, and performs correction to remove pattern noise inherent in the image sensor 1.

As shown in FIG. 7, the memory controller 34 is synchronized with the image sensor 1 by operating based on a signal from the timing control block 8, which operates in synchronism with the timing generator 3. The memory controller 34 converts a sensor signal from the image sensor 1, which sequentially passes thorough the CDS/AGC/AD circuit 29 and the correction block 30, into predetermined pulse-width data and transfers the converted data to the buffer memory 33 by use of burst writing.

Similarly, the memory controller 36 is synchronized with the image sensor 1 by operating based on a signal from the timing control block 18, which operates in synchronism with the timing generator 3. The memory controller 36 converts a sensor signal from the image sensor 1, which sequentially passes thorough the CDS/AGC/AD circuit 31 and the correction block 32, into predetermined pulse-width data and transfers the converted data to the buffer memory 35 by use of burst writing.

As described above, the output on the side of the channel CH1 of the image sensor 1 (the right half plane of the image sensor shown in FIG. 9) is stored in the buffer memory 33, and the output on the side of the channel CH2 of the image sensor 1 (the left half plane of the image sensor shown in FIG. 9) is stored in the buffer memory 35. As a result, a single captured image is stored in two memories that exist physically and logically in separate spaces.

When writing of image data of predetermined size is completed, the memory controller 34 temporarily transfers captured image data stored in the buffer memory 33 to the work memory 12.

Then, the memory controller 34 sequentially transfers image data stored in the work memory 12 to the color processing block 13, which is also connected to the bus A1, so as to perform the so-called picture adjustment.

The processing operation of the color processing block 13 is described below with reference to a block diagram of FIG. 4, which illustrates the internal construction of the color processing block 13. Image data supplied from the work memory 12 via the bus A is applied to a data input/output I/F 50. The data input/output I/F 50 converts the image data into data of predetermined data width and supplies the converted image data to a color interpolation block 52. The color interpolation block 52 performs color interpolation processing to convert the image data into RGB data of three planes in cases where the image sensor 1 has a color filter array known as the Bayer array.

Image data processed by the color interpolation block 52 is then applied to a matrix correction block 53. The matrix correction block 53 performs matrix correction for outputting desired colors on the basis of spectral characteristics of a color filter inherent in the image sensor 1 and performs RGB-to-RGB conversion of image data.

Image data processed by the matrix correction block 53 is then applied to a gamma conversion block 54. The gamma conversion block 54 performs the so-called gamma conversion to cause image data to fall within a predetermined dynamic range by converting 12-bit digital data subjected to CDS/AGC/AD processing into 8-bit digital data.

Image data processed by the gamma conversion block 54 is then applied to an RGB-YCrCb conversion block 55. The RGB-YCrCb conversion block 55 performs color conversion processing from RGB to YCrCb and outputs the processed image data to a false-color elimination block 56. The false-color elimination block 56 performs processing for eliminating false colors occurring in Cr and Cb components.

An example of false-color elimination processing is the use of a median filter to eliminate color moiré patterns, etc., caused by the relationship between sampling frequency and image frequency.

Image data processed by the false-color elimination block 56 is then applied to an edge enhancement block 57. The edge enhancement block 57 performs edge enhancement processing for increasing the gain near an intermediate frequency of image data so as to enhance the contour of an image, and outputs the processed image data to a resolution conversion block 58. The resolution conversion block 58 resizes the image data into data of predetermined size.

When resizing into data of predetermined size is performed, image data is subjected to filtering processing and then to sub-sampling processing. These processing operations are performed equally with respect to the horizontal direction and vertical direction.

The above-described processing operations are sequentially performed for one frame. Image data processed by the color processing block 13 is then outputted to the work memory 12 via the data input/output I/F 50 and is stored again in individual areas of the work memory 12.

In the color processing block 13, each element block has its properties freely changeable based on data from the overall control CPU 25 via a parameter setting block 51. Accordingly, a user can change conditions of the picture adjustment for every captured image.

The memory controller 34 then sequentially transfers color-processed image data re-stored in the work memory 12 to the JPEG processing block 14, which is also connected to the bus A1. The JPEG processing block 14 performs image compression processing.

Operation of the JPEG processing block 14 is described below with reference to FIGS. 5 and 6.

FIG. 5 shows components of the JPEG processing block 14, which is the lossy compression type and is based on frequency conversion using DCT in accordance with an embodiment of the present invention.

In the JPEG processing block 14, the above-described color-processed image data stored in the work memory 12 is supplied to a raster-block conversion block 63 via a data input/output I/F 60. The raster-block conversion block 63 converts image data into two-dimensional blocks of data, each block being composed of 8 pixels in the horizontal direction by 8 pixels in the vertical direction.

Image data processed by the raster-block conversion block 63 is then applied to a DCT conversion block 64. The DCT conversion block 64 performs DCT conversion for converting blocks of 8×8 pixels into data of 8×8 pixels for every frequency component and calculates coefficients indicating low-frequency components up to high-frequency components in two-dimensional space.

Image data processed by the DCT conversion block 64 is then applied to a quantization block 65. The quantization block 65 performs quantization on coefficient values calculated by the DCT conversion block 64. This quantization is achieved by division for every coefficient on the basis of values previously set in a quantization table 61.

Then, the quantized data is read out from the quantization block 65 along a predetermined scanning direction and is applied to a Huffman coding block 66. The Huffman coding block 66 performs entropy coding based on values previously set in a Huffman table 62.

Image data compressed by the above-described method is again written in a predetermined area of the work memory 12 via the data input/output I/F 60. Then, a series of compression operations ends.

As another example of JPEG compression, a compression method of the lossless type is described below with reference to FIG. 6.

FIG. 6 is a block diagram showing the internal construction of the JPEG processing block 14 in cases where the JPEG processing block 14 is of the lossless compression type, which is based on DPCM (differential pulse code modulation). In the JPEG processing block 14, the above-described color-processed image data stored in the work memory 12 is supplied to a DPCM conversion block 72 via a data input/output I/F 70. The DPCM conversion block 72 converts image data into difference data relative to predicted values.

Then, the DPCM-converted image data is read out from the DPCM conversion block 72 and is applied to a Huffman coding block 73. The Huffman coding block 73 performs entropy coding based on values previously set in a Huffman table 71.

Image data compressed by the above-described method is again written in a predetermined area of the work memory 12 via the data input/output I/F 70. Then, a series of compression operations ends.

The image data compressed by the JPEG processing block 14 according to a predetermined compression format as described above is then stored in the card memory 16 (usually, a non-volatile memory such as a flash memory) via the card controller 15.

The user can select a viewing mode of the image capture system in which images represented by captured image data can be viewed. In the viewing mode, compressed image data stored in the card memory 16 is read out and is decompressed by the JPEG processing block 14 into normal image data for every pixel. The resultant image data is then transferred to the work memory 12 so as to externally display a reduced-size image represented by the image data on a monitor display device (not shown).

The image processing block 135 is also provided so as to process image data supplied via the memory controller 36 in the same manner as the image processing block 134.

In the image processing block 135, captured image data from the correction block 32 is stored in the buffer memory 35 via the memory controller 36. Then, the image data stored in the buffer memory 35 is transferred to the work memory 20 via the memory controller 36.

The memory controller 36 reads out image data from the work memory 20 according to a timing signal from the timing control block 18 and transfers the read-out image data to the color processing block 21. The color processing block 21 performs the picture adjustment according to the above-described method and transfers the processed image data to the work memory 20 again.

Then, the memory controller 36 reads out the processed image data stored in the work memory 20 and transfers the read-out image data to the JPEG processing block 22. The JPEG processing block 22 performs JPEG compression processing according to the above-described method and writes the compressed image data in the work memory 20.

The compressed image data is then written to the card memory 24 via the card controller 23 so that recording of the captured image is complete.

With regard to control of the whole image capture system and sequence control of the memory controller 34, etc., the overall control CPU 25 executes instructions in accordance with instruction codes stored in the instruction memory 26, which is connected to the bus B connected to the overall control CPU 25. For example, the overall control CPU 25 controls driving of the main photographic optical system 27 via the lens control portion 28 (focus driving and aperture driving) and performs shutter exposure control via a shutter control portion (not shown). Further, the overall control CPU 25 attaches various items of information, such as header information and shooting condition information, to captured image data processed in the image processing block 134 via the communication I/F 11 and stores these items of information in the memory card 16.

Similarly, the overall control CPU 25 also performs the same processing for the image processing block 135 via the communication I/F 19 and stores various items of information in the memory card 24.

With the construction of the image capture system as described above, image data from a right half of the image plane of the image sensor 1 is processed by the image processing block 134, and image data from a left half of the image plane of the image sensor 1 is processed by the image processing block 135. Therefore, with regard to filter processing performed in color processing, image data from a central area of the image plane of the image sensor 1 is processed by both the image processing blocks 134 and 135 in an overlapping manner.

Furthermore, with regard to JPEG processing, dividing one captured image frame into right and left half planes and separately processing image data from the right and left half planes may not be practical. Therefore, when the color processing is completed, processed image data is transferred to one of the image processing blocks 134 and 135, and image compression is performed by use of one of the JPEG processing blocks 14 and 22.

In this case, data transfer is required between the image processing block 134 and the image processing block 135.

The manner of transferring data between the image processing blocks 134 and 135 is described below with reference to FIG. 8.

Figure 8:
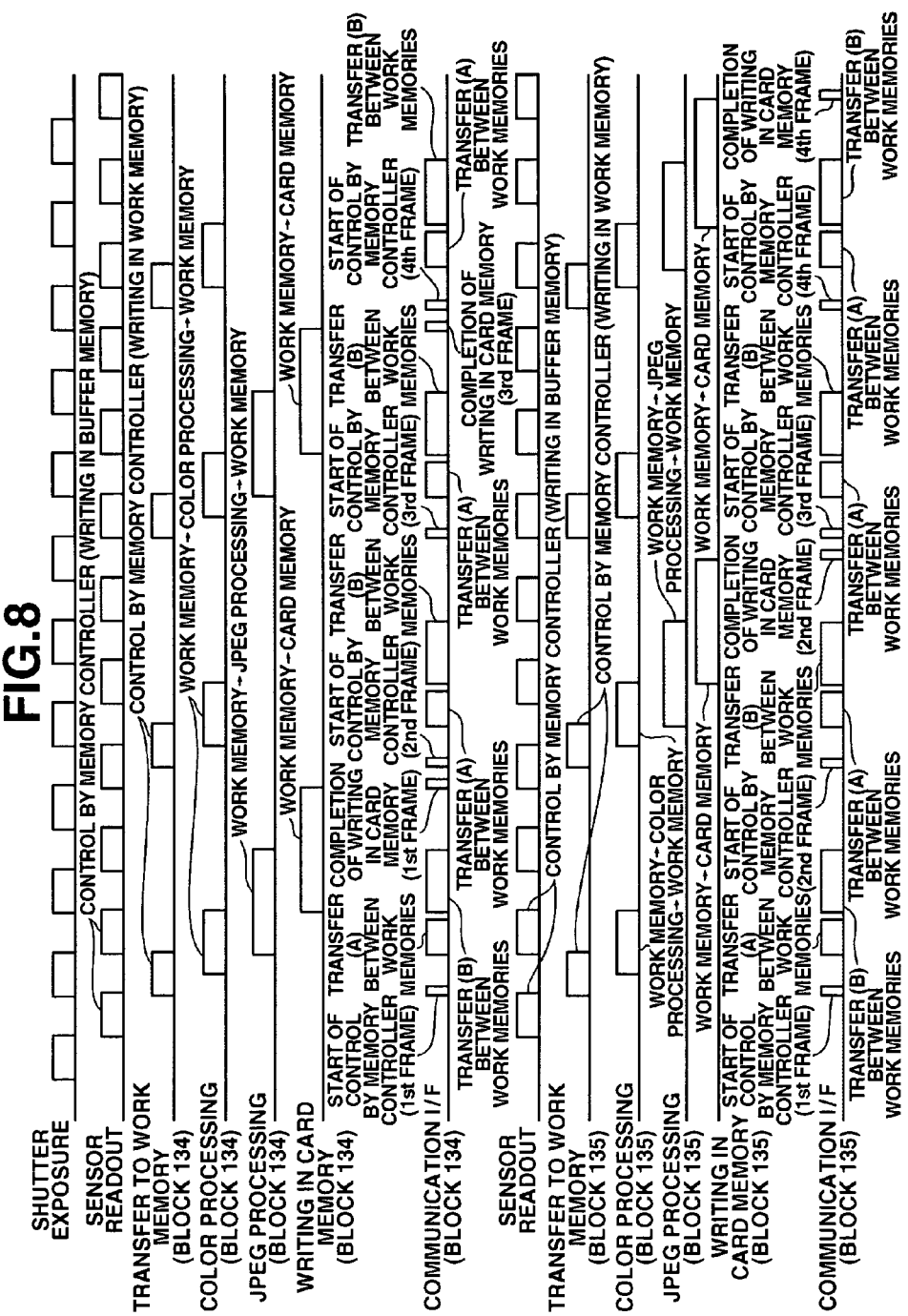
FIG. 8 is a timing chart illustrating the timing of operation of the image capture system according to the third embodiment.

FIG. 8 is a timing chart illustrating the timing of image capturing and processing sequence of the image capture system for a continuous shooting operation according to the third embodiment of the present invention. In FIG. 8, the first line shows the timing of shutter exposure, which is sequentially performed from frames one through twelve at approximately the same intervals.

The second line in FIG. 8 shows the timing of a readout operation from the image sensor 1. The readout operation from the image sensor 1 starts at the same time as completion of shutter exposure for each frame. As described above, captured image data is written in the buffer memory 33 under the control of the memory controller 34 in the image processing block 134.

Similarly, the eighth line in FIG. 8 shows the timing of a readout operation from the image sensor 1 with respect to the image processing block 135. At the same timing as in the image processing block 134, captured image data is written in the buffer memory 35 under the control of the memory controller 36 in the image processing block 135.

Then, image processing starts with respect to captured image data of the first frame. In this instance, as indicated by the operation timing of the communication I/F 11 shown in the seventh line in FIG. 8, the memory controller 34 starts its control operation in response to an instruction from the overall control CPU 25, and transfers image data stored in the buffer memory 33 to the work memory 12, as indicated by the timing shown in the third line in FIG. 8.

Similarly, with respect to the image processing block 135, as indicated by the operation timing of the communication I/F 19 shown in the last line in FIG. 8, the memory controller 36 starts its control operation in response to an instruction from the overall control CPU 25, and transfers image data stored in the buffer memory 35 to the work memory 20, as indicated by the timing shown in the fifth line from the bottom in FIG. 8.

The fourth line in FIG. 8 shows the timing of color processing in the image processing block 134. The fifth line shows the timing of JPEG processing in the image processing block 134.

Similarly, the fourth line from the bottom in FIG. 8 shows the timing of color processing in the image processing block 135. The third line from the bottom shows the timing of JPEG processing in the image processing block 135.

Figure 10:
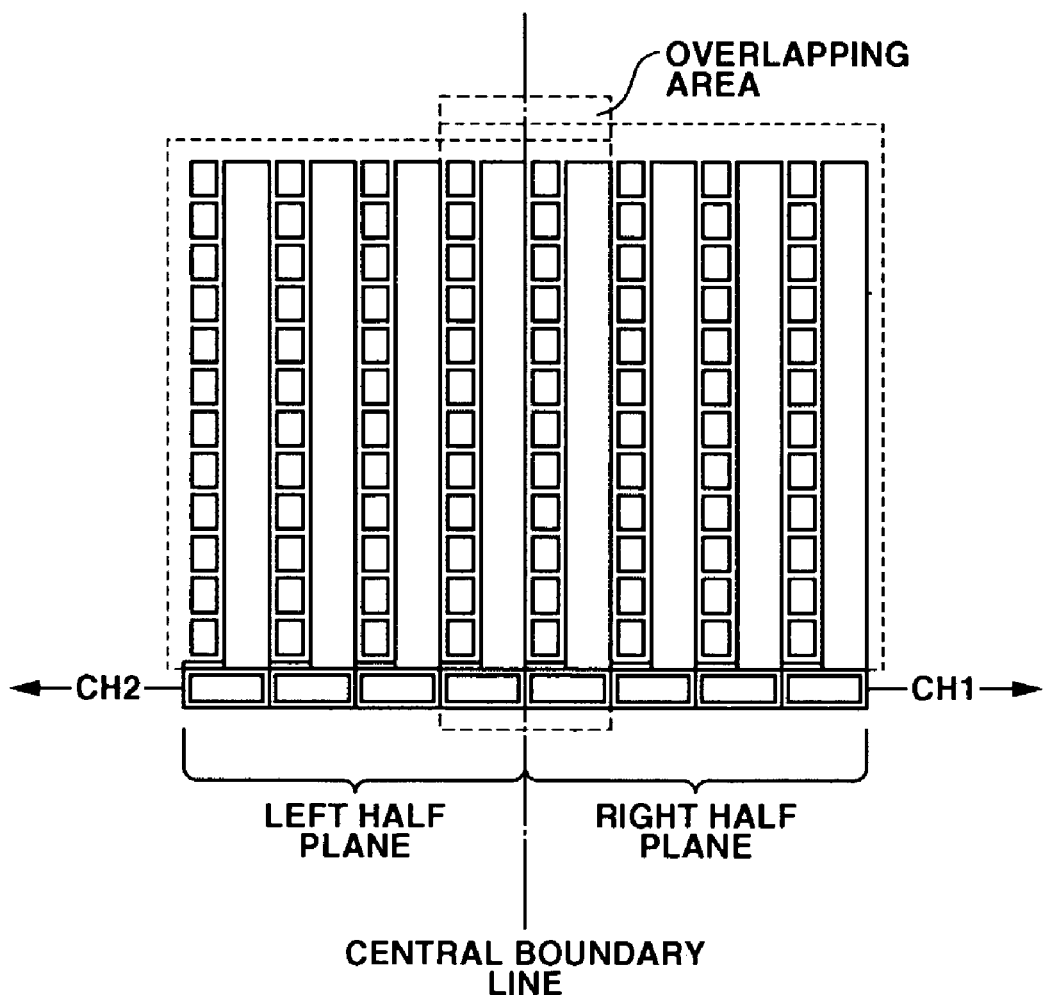
FIG. 10 is a schematic diagram illustrating ranges of image processing in the image sensor shown in FIG. 9.

In performing color processing in the image processing blocks 134 and 135, image data from an area near the central boundary line of the image plane of the image sensor 1, as shown in FIG. 9, is processed by both the image processing blocks 134 and 135 in an overlapping manner. That is, with regard to a predetermined range (overlapping area) defined with the central boundary line of the image plane as shown schematically shown in FIG. 10, image data from a left half plane portion is also processed by the image processing block 134, and image data from a right half plane portion is also processed by the image processing block 135.

Accordingly, in this case, the image processing blocks 134 and 135 transfer image data between each other, as shown in the seventh line and the last line in FIG. 8 representing the timing of the communication I/Fs 11 and 19.

For example, in the case of the timing of the communication I/F 11 shown in the seventh line in FIG. 8, a portion of image data stored in the work memory 20 is transferred to the work memory 12. Similarly, in the case of the timing of the communication I/F 19 shown in the last line in FIG. 8, a portion of image data stored in the work memory 12 is transferred to the work memory 20.

Furthermore, with regard to JPEG processing, image data processed by the color processing block 13 or 21 and stored in the work memory 12 or 20 is transferred from one of the image processing blocks 134 and 135 to the other. In the other image processing block 134 or 135, the JPEG processing block 14 or 22 performs compression processing.

For example, as shown in the seventh line and the last line in FIG. 8 representing the timing of the communication I/Fs 11 and 19, captured image data of the first frame processed by the color processing block 21 and stored in the work memory 20 of the image processing block 135 is transferred to the work memory 12 of the image processing block 134. Then, the JPEG processing block 14 of the image processing block 134 performs compression processing on the whole captured image data of the first frame.

Then, as shown in the sixth line in FIG. 8, compressed image data stored in the work memory 12 is written in the card memory 16 via the card controller 15.

After the first frame image data is completely written into the card memory 16, an interrupt signal is generated by the rear memory controller 34. The interrupt signal is used to inform the overall control CPU 25 that processing of the first frame image data is complete.

In the case of processing of captured image data of the second frame, the memory controller 34 in the image processing block 134 and the memory controller 36 in the image processing block 135 start their control operations in response to instructions from the overall control CPU 25 via the communication I/Fs 11 and 19 and cause the color processing blocks 13 and 21 and the JPEG processing blocks 14 and 22 to start color processing and JPEG processing in the same manner as described above.

In this instance, however, color-processed image data stored in the work memory 12 of the image processing block 134 is transferred to the work memory 20 of the image processing block 135 via the communication I/Fs 11 and 19. Then, the JPEG processing block 22 in the image processing block 135 performs compression processing on the whole captured image data of the second frame. The compressed image data is then written in the card memory 24 via the card controller 23.

After the second frame image data is completely written into the card memory 24, an interrupt signal is generated by the rear memory controller 36. The interrupt signal is used to inform the overall control CPU 25 that processing of the second frame image data is complete.

In the actual operation, image compression processing of capture image data of the second frame can start before completion of image compression processing of captured image data of the first frame in the image processing block 134. Accordingly, the processed image data of the first and second frames are stored in the separate card memories 16 and 24.

In the case of the timing shown in FIG. 8, processing of image data of the odd-numbered frames is performed by the image processing block 134 and processing of image data of the even-numbered frames is performed by the image processing block 135. However, such allocation of processing of captured image frames is not necessarily limitative. Any one of the image processing blocks 134 and 135 that has completed its processing operation before the next processing begins can be used for that processing.

For example, where processing of the second frame is completed at the image processing block 135 before processing of the first frame is completed at the image processing block 134, processing of the third frame can be performed by the image processing block 135 in succession. Note that there may be little or no time difference between processing of the first and second frames. Thus, the start of timing of processing by the image processing block 134 may be closer to that by the image processing block 135 as the processing operation proceeds, and the image processing block 135 may complete its processing operation prior to completion of processing by the image processing block 134.

This allocation can be attained as follows. The overall control CPU 25 detects an interrupt signal transmitted from the memory controller 34 or 36 via the communication I/F 11 or 19 of the image processing block 134 or 135 and, on the basis of such detection, determines which of the image processing blocks 134 and 135 should perform processing of image data of the next frame.

While, in the third embodiment, two image processing blocks 134 and 135 are connected in parallel with the image sensor 1, the present invention should not be limited to such arrangement. For example, three or more image processing blocks can be connected in parallel and can be switched in accordance with a shooting condition, etc.

As discussed above, according to the third embodiment, an image capture system is provided that increases processing speed after an image is captured while increasing the rate at which data is read from an image capture device during a shooting sequence. More specifically, in a continuous shooting operation, image data are read out at high speed from an image sensor via a plurality of output lines. The read-out image data are temporarily stored, without changing its format (in the RAW data format), in a continuous fashion in the respective buffer memories via the respective memory controllers connected to the respective output lines. During such storing operation, processing of captured image data of the first frame is divisionally performed at the separate image processing blocks at the same time, and some operations of processing of captured image data of the second frame also start. By employing this method, the disadvantage of the related art wherein the number of frames capturable in a single continuous shooting operation is limited by low-speed image processing is avoided.

Furthermore, in performing the above-described multiple processing, a highly functional multiple processing system can be formed in place of a fixed multiple processing system in which processing of image data of the odd-numbered fames is performed by a first image processing block and processing of image data of the even-numbered frames is performed by a second image processing block. In the highly functional multiple processing system, any image processing block, among a plurality of image processing blocks, which has already completed its processing operation and is ready to start the next processing operation is preferentially used, thereby enabling a higher-speed image capture system to be realized.

As many apparently widely different embodiments of the present invention can be made without departing from the spirit and scope thereof, it is to be understood that the invention is not limited to the specific embodiments thereof except as defined in the appended claims.

What is claimed is:

1. An image capture system comprising:
an image capture device configured to sequentially capture an object image by a single sensor and sequentially outputting a plurality of frame images including at least a first frame image and a second frame image,
wherein the second frame image sequentially follows the first frame image with no intervening frames;

a plurality of image processing devices configured to perform a still image processing; and a distribution device for distributing the plurality of frame images from the image capture device to the plurality of image processing devices in unit of single frame, wherein, in a continuous still image shooting mode for sequentially capturing the object image to output the first frame image and to output the second frame image next to the first frame image, a first image processing device among the plurality of image processing devices processes the first frame image and outputs the processed first frame image to be recorded as one still image during the time when a second image processing device among the plurality of image processing devices processes the second frame image sequentially following the first frame image with no intervening frames and directly, without going through the first image processing device, outputs the processed second frame image to be recorded as one still image.

2. An image capture system according to claim 1, further comprising a temporary storage device for temporarily storing the plurality of frame images output from the image capture device, wherein each of the plurality of image processing devices reads out at least one of the plurality of frame images stored in the temporary storage device and processes the read-out frame image to generate a processed image.

3. An image capture system according to claim 1, wherein the distribution device outputs the frame images preferentially to an image processing device that is ready to process the frame image among the plurality of image processing devices.

4. An image capture system according to claim 1, wherein the plurality of image processing devices includes a first image processing device and a second image processing device, and in a case where the first image processing device is performing image processing for the first frame image and the second image processing device is ready to start the next processing operation, the distribution device distributes the second frame to the second image processing device, and the second image processing devise starts performing image processing for the second frame image before the first image processing device finishes performing image processing for first frame image.

5. An image capture system according to claim 1, wherein the image capture device implements a plurality of shutter exposure process to obtain the first frame image and the second frame image.

6. An image capture system according to claim 1, wherein the distribution device is constructed as one chip, wherein each of the plurality of image processing devices has an image process controller, an interface in communication with the distribution device, and a bus connecting the image process controller with the interface.

7. An image capture system according to claim 6, further comprising a concurrent process control device to transmit a timing control instruction of the concurrent process to the plurality of image processing devices wherein the interface receives the instruction and the image process controller controls the image process in accordance with the instruction.

8. An image capture system according to claim 1, wherein the first frame image and the second frame image are each one frame image, wherein the image capture device implements a plurality of shutter exposure processes to obtain the first frame image and the second frame image, and wherein the shutter exposure process to obtain the first frame image and the shutter exposure process to obtain the second frame image are different from each other.

9. An image capture method for an image capture system including an image capture device configured to sequentially capture an object image by a single sensor and sequentially outputting a plurality of frame images including at least a first frame image and a second frame image, wherein the second frame image sequentially follows the first frame image with no intervening frames, a plurality of image processing devices provided in parallel with each other, the image capture method comprising:

distributing the plurality of frame image from the image capture device to the plurality of image processing device in unit of single frame; and in a continuous still image shooting mode for sequentially capturing the object image to output the first frame image and to output the second frame image next to the first frame image, causing a first image processing device among the plurality of image processing devices to process the electrical signal for the first frame image and to output the processed first frame image to be recorded as one still image and causing a second image processing device among the plurality of image processing devices to process the electrical signal for the second frame image during the time when the first image processing device processes the first frame image sequentially following the first frame image with no intervening frames and to directly, without going through the first image processing device, output the processed second frame image to be recorded as one still image.

10. An image capture system according to claim 9, wherein the first frame image and the second frame image are each one frame image, wherein the image capture device implements a plurality of shutter exposure processes to obtain the first frame image and the second frame image, and wherein the shutter exposure process to obtain the first frame image and the shutter exposure process to obtain the second frame image are different from each other.

11. An image capture system comprising:

an image capture device configured to sequentially capture an object image by a single sensor and sequentially outputting a plurality of frame images including at least a first frame image and a second frame image, wherein the second frame image sequentially follows the first frame image with no intervening frames;

a plurality of image processing devices configured to perform a still image processing;

a distribution device for distributing the first frame image and the second frame image from the image capture device to the plurality of image processing devices; and a control device for controlling each of the plurality of image processing devices concurrently to process the first frame image and the second frame image, respectively, wherein, in a continuous still image shooting mode for sequentially capturing the object image to output the first frame image and output the second frame image next to the first frame image, the control device controls a first image processing device and a second image processing device among the plurality of image processing devices so that the first image processing device processes the first frame image and outputs the processed first frame image to be recorded as one still image during the time when the second image processing device processes the second frame image sequentially following the first frame image with no intervening frames and directly, without going through the first image processing device, outputs the processed second frame image to be recorded as one still image.

12. An image capture method for an image capture system comprising:
   sequentially capturing an object image by a single sensor and sequentially outputting a plurality of frame images including at least a first frame image and a second frame image,
   wherein the second frame image sequentially follows the first frame image with no intervening frames;
   distributing the first frame image and the second frame image to a plurality of image processing devices that performs a still image processing; and
   controlling, in a continuous still image shooting mode for sequentially capturing the object image to output the first frame image and to output the second frame image next to the first frame image, a first image processing device and a second image processing device among the plurality of image processing devices so that the first image processing device processes the first frame image and outputs the processed first frame image to be recorded as one still image during the time when the second image processing device processes the second frame image sequentially following the first frame image with no intervening frames and directly, without going through the first image processing device, outputs the processed second frame image to be recorded as one still image.

13. An image capture system according to claim 11, wherein the first frame image and the second frame image are each one frame image,
   wherein the image capture device implements a plurality of shutter exposure processes to obtain the first frame image and the second frame image, and
   wherein the shutter exposure process to obtain the first frame image and the shutter exposure process to obtain the second frame image are different from each other.

* * * * *